United States Patent [19]

Elmer

[11] 4,409,055
[45] Oct. 11, 1983

[54] ADHESION OF RUBBER TO ARAMID CORDS

[75] Inventor: Otto C. Elmer, Akron, Ohio

[73] Assignee: The General Tire & Rubber Company, Akron, Ohio

[21] Appl. No.: 457,500

[22] Filed: Jan. 12, 1983

Related U.S. Application Data

[63] Continuation of Ser. No. 331,698, Dec. 17, 1981, abandoned.

[51] Int. Cl.$^3$ .................. B29H 5/02; B32B 27/34; C09J 5/02
[52] U.S. Cl. .................. 156/307.5; 156/331.6; 156/335; 156/331.2; 427/434.6; 428/395; 524/510
[58] Field of Search .................. 525/139, 142, 68, 69; 156/110 A, 335, 307.5, 331.6; 427/393.5, 434.6; 428/395; 524/510

[56] References Cited

U.S. PATENT DOCUMENTS

| | | | |
|---|---|---|---|
| 3,895,163 | 7/1975 | Elmer | 428/295 |
| 3,896,253 | 7/1975 | Elmer | 428/382 |
| 4,145,494 | 3/1979 | Newbert | 526/80 X |
| 4,251,409 | 2/1981 | Newbert | 428/395 X |

Primary Examiner—Michael R. Lusignan

[57] ABSTRACT

An aramid reinforcing element or cord is dipped in an aqueous adhesive composition of a phenolic-aldehyde resin and a vinyl pyridine latex and dried. The treatment is repeated again and preferably for three times. The repeatedly treated cord is then cured with a rubber compound to give improved H-adhesion values. If desired, a primer treatment with an epoxide may proceed the aqueous adhesive composition treatments.

14 Claims, No Drawings

ADHESION OF RUBBER TO ARAMID CORDS

This is a continuation of application Ser. No. 06/331,698 filed Dec. 17, 1981 now abandoned.

This invention relates to the adhesion of rubber to aramid reinforcing elements like fibers or cords using a multiple dip system.

OBJECTS

An object of this invention is to provide a process for adhering or binding rubber to aramid fibers or reinforcing elements providing an increased adhesive bond between the aramid fibers and rubber. Another object is to provide aramid reinforcing elements, fibers or cords with a minor amount of an adhesive so that subsequently said adhesive coated element may be bonded to rubber. A further object is to provide a composite of an aramid reinforcing element bonded to a rubber compound. These and other objects and advantages of the present invention will become more apparent to those skilled in the art from the following detailed description and working examples.

SUMMARY OF THE INVENTION

According to the present invention it has been found that an increased bond between an aramid cord and rubber can be obtained by repeatedly dipping and drying the cord in an aqueous adhesive composition of a phenolic-aldehyde resin and latex. For example, the cord is dipped in the aqueous adhesive composition and dried (heat set or cured), the entire step is repeated again. In other words at least two treatments are desired. Then the twice dipped and dried cord is combined or embedded in the rubber and cured. Preferably, three successive dips are used. More than three treatments can be done but are usually not necessary. Optionally, a first or primer dip of an epoxide dispersion or solution may be used, followed by drying, prior to successively dipping in the aqueous phenolic-aldehyde and latex composition with some improvements on heat aging although it may not always be necessary. It is believed that some wicking of or penetration into the cord by the dip occurs in the first dip treatment so that full coverage of the cord does not occur. In other words, there is a variation in the surface coverage of the cord so that there is insufficient contact between the adhesive and the rubber. The second and preferably the third treatment increase the coverage and provide the increased adhesion.

DISCUSSION OF DETAILS AND PREFERRED EMBODIMENTS

The aramid used as a reinforcing element in the practice of the present invention is poly(p-phenylene terephthalamide), e.g.

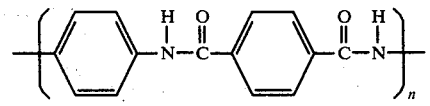

where n is a number. It is known as KEVLAR and is manufactured by the duPont Company. The aramid reinforcing element may be in the form of fibers, continuous filaments, staple, tow, yarns, cords (preferred), fabric and so forth.

The water soluble thermosetting (het reactable) phenolic-aldehyde resin is made by reacting an aldehyde with a phenolic compound. The preferred aldehyde to use of formaldehyde, but acetaldehyde and furfural, also, may be used. In place of formaldehyde one may use paraformaldehyde or other formaldehyde donors such as hexamethylenetetramine and so forth. Also, it is preferred to start with formalin, usually a 37% solution of formaldehyde in water, which is easier to use. Mixtures of aldehydes can be used. The phenolic compound can be phenol itself, resorcinol, the cresols, the xylenols, p-tert butylphenol or p-phenyl phenol or mixture thereof. Mixtures of resins can be used. If a phenol-aldehyde resin is used, some resorcinol and/or resorcinol-aldehyde resin should be added to prevent or reduce tackiness. Th reactants are reacted in water usually in the presence of a catalyst. One may start with a thermoplastic resin by reacting less than a molar amount of the aldehyde with the phenolic to form a condensation product and then may add sufficient aldehyde at the time the dip is formulated to convert the product to a thermosetting or infusible resin on heating. Alternatively, one may react a molar excess of the aldehyde with the phenolic to form a thermosetting type condensation product on heating and which should be used promptly. However, the alternative reaction is somewhat slower. In any event, the final product on heating is a thermoset phenolic-aldehyde resin. Alkaline material is generally added before use. Information on the preparation of the water soluble thermosetting phenolic-aldehyde resins will be found in "Encyclopedia of Chemical Technology," Kirk-Othmer, Volume 15, Second Edition, 1968, Interscience Publishers Division of John Wiley & Sons, Inc., New York, pages 176 to 208; "Technology of Adhesives," Delmonte, Reinhold Publishing Corp., New York, N.Y., 1947, pages 22 to 52; "Formaldehyde," Walker, A.C.S. Monograph Series, Reinhold Publishing Corp., New York, N.Y., Third Edition, 1964, pages 304 to 344; and "The Chemistry of Phenolic Resins," Martin, John Wiley & Sons, Inc., New York, 1956.

Rubbery aqueous alkaline vinyl pyridine copolymer latices are well known. See U.S. Pat. Nos. 2,561,215; 2,615,826; 3,437,122 and 4,145,494. They comprise a copolymer of about 50 to 95% by weight of butadiene-1,3, 5 to 40% by weight of a vinyl pyridine, and 0 to 40% by weight of a vinyl aromatic compound like styrene. Examples of suitable vinyl pyridines are 2-vinyl pyridine, 4-vinyl pyridine, 2-methyl-5-vinyl pyridine and 5-ethyl-2-vinyl pyridine. It is usually preferred to use a latex of a terpolymer of about 60 to 80% by weight of a butadiene-1,3, about 7 to 32% by weight of styrene and from about 4 to 22% by weight of 2-vinyl pyridine. Even more preferred is a terpolymer of about 70% by weight of butadiene-1,3, 15% styrene and 15% 2-vinyl pyridine. Part of the vinyl pyridine copolymer may be replaced with a rubbery butadiene-styrene copolymer and/or a rubbery polybutadiene so long as the relative ratios between the butadiene-1,3 vinyl pyridine and styrene remain as set forth above.

The rubbery vinyl pyridine copolymer and the rubbery polybutadiene or rubbery butadiene copolymer are made in water using free radical catalysts, chelating agents, modifiers, emulsifiers, surfactants, stabilizers, short stopping agents and so forth. They may be hot or cold polymerized, and polymerization may or may not be carried to abut 100% conversion. If polymerizations are carried out with appropriate amounts of chain transfer agents or modifiers and conversions are stopped below 100% conversion, low or no gel polymers are possible. Free radical aqueous emulsion polymerization is well known as shown by:

(1) Whitby et al, "Synthetic Rubber," John Wiley & Sons, Inc., New York, 1954;
(2) Schildknecht, "Vinyl and Related Polymers," John Wiley & Sons, Inc., New York, 1952;
(3) "Encyclopedia of Polymer Science and Technology," Interscience Publishers a division of John Wiley & Sons, Inc., New York, Vol. 2 (1965), Vol. 3 (1965), Vol. 5 (1966), Vol. 7 (1967) and Vol. 9 (1968) and
(4) Bovey et al., "Emulsion Polymerization," Interscience Publishers, Inc., New York, 1955.

In addition to the surfactants or wetting agents, and any antioxidants already in the latex, additional surfactants, antioxidants and antidegradants may be added to the resin-latex dip in minor amounts.

The pH of the latex and of the dips should be on the alkaline side and the pH of any surfactants and stabilizers, including freeze-thaw stabilizers and other additives should be on the alkaline side or compatible or be neutral to avoid improper coagulation of the latex or latices.

Water is used in the adhesive phenolic-aldehyde/-latex dip in an amount sufficient to provide for the desired dispersion of the rubber or latex particles, and for the solution of the resin and any other additives, to obtain the desired viscosities, and for the proper solids content to get the necessary pickup of solids on and penetration between the fibers of the cord. The amount of water in the adhesive cord dip generally may vary so as to provide a solids content of from about 10 to 50%, preferably from about 20 to 25%, by weight. Too much water may require use of excess heat to evaporate the water on drying. Too little water may cause uneven penetration or too slow coating speeds.

On a dry weight basis the phenolic-aldehyde resin is used in an amount of about 3 to 25, preferably from about 6 to 20, parts by weight per 100 parts by weight of the rubber of the latex of the dip.

If the epoxide primer is used it can comprise an aqueous solution or dispersion of from about 0.3 to 10% by weight solids of an epoxide having an average of from about 2 to 4 epoxide groups per molecule. The amount of the polyepoxide can be adjusted within these limits to obtain the desired viscosity of the dispersion or solution as well as the amount of polyepoxide to obtain the desired final pickup (after drying) of polyepoxide solids or the polyamide cord and of course the desired adhesion. The amount of solids of polyepoxide deposited on the cord can vary from about 0.01 to 1.5% by weight. Examples of suitable epoxies are triglycidyl isocyanurate; 1-epoxyethyl-3,4-epoxycyclo-hexane; vinyl cyclohexene dioxide; ethylene glycol diglycidic ether; 1,2-propanediol diglycidic ether; 1,3-propanedioldiglycidic ether; 1,3-butanedioldiglycidic ether; 1,4-butanediol diglycidic ether; 2,3-butanediol-diglycidic ether; and the glycidyl ethers of glycerol, erythritol, pentaerythritol, and sorbitol which contain two to three glycidic groups per molecule, for example, the diglycidyl ether of glycerol (preferred), the triglycidyl ether of hexanetriol and so forth. Still other polyepoxides can be used such as 3,4-epoxycyclohexyl methyl-3,4-epoxy cyclohexane carboxylate; 3-(3,4-epoxycyclohexane)-8,9-epoxy-2,4-dioxaspiro[5.5]-undecane; bis(2,3-epoxycyclopentyl)ether; bis(3,4-epoxy-6-methylcyclohexyl methyl) adipate; the diglycidyl ether of polyethylene glycol 400; polyallyl glycidyl ether; the diglycidyl ether of bisphenol A; epoxy resorcinol ethers and the like. Mixtures of these polyepoxides can be used. These polyepoxides have a molecular weight of up to about 600. Preferred are the water soluble polyglycidyl ethers including the polyhydroxylated saturated aliphatic hydrocarbons of from 2 to 10 carbon atoms, especially frowm those hydrocarbons having from 2 to 3 hydroxyl groups. These materials are generally well known and can be made by methods disclosed in the prior art as shown by:

(a) "Encyclopedia of Chemical Technology," 2nd Ed., Kirk-Othmer, Volume 8, Interscience Publishers a division of John Wiley & Sons, Inc., New York, 1965, pages 238 to 312;
(b) "Encyclopedia of Polymer Science and Technology," First Edition, Volume 6, Interscience Publishers a division of John Wiley & Sons, Inc., New York, 1967, pages 83 to 102, 106, 108, 146 to 148, 168 to 170 and 209 to 222;
(c) "Cyclic Monomers," Frisch, Wiley-Interscience a division of John Wiley & Sons, Inc., New York, 1972, pages 1 to 54;
(d) "Polyethers," Part I Polyalkylene Oxides and Other Polyethers, Gaylord, Interscience Publishers a division of John Wiley & Sons, Inc., New York, 1963, pages 83 to 102 and
(e) "Epoxy Resins," Lee and Neville, McGraw-Hill Book Company, Inc., New York, 1957.

Surfactants can be added to the epoxide dispersion or solution to facilitate mixing and cord pick-up. Also, NaOH or NH$_4$OH may be added to the epoxide to maintain an alkaline condition.

To apply the resin/latex dip to the aramid fiber cords in a reliable manner, the cords are fed through the adhesive dip bath while being maintained under a small predetermined tension and into a drying oven where they are dried under a small predetermined tension (to prevent sagging without any appreciable stretching). As the cords leave the oven they enter a cooling zone where they are air cooled before the tension is released. In each case the adhesive-coated cords leaving the dip are dried (cured or heat set) in the oven at from about 200° to 600° F. (93.3° to 315.6° C.) for from about 300 to 5 seconds. The time the cord remains in the adhesive is about a few seconds or more or at least for a period of time sufficient to allow wetting of the cord and at least some impregnation of the fibers of the cord. The successive treatments, e.g., dipping and drying with the resin/latex dips are conducted in the same fashion. Thus, the second dip on the first dipped cord will be followed by drying, the third dip on the cords dipped the second time will be followed by drying and so forth. If the epoxide primer dip is employed, the dip and drying conditions should follow the same procedure.

The single-cord H-pull, H-adhesion, test is employed to determine the static adhesion of the dried (heat set or cured) adhesive coated aramid fiber cords to rubber. In each case the rubber test specimens are made from a vulcanizable rubber composition comprising rubber, reinforcing carbon black and the customary compounding and curing ingredients. In every case the cords to be tested are placed in parallel positions in a multiple-strand mold of the type described in the single-cord H-pull adhesion test ASTM designated D 2138-72, the mold is filled with the unvulcanized rubber composition, the cords being maintained under a tension of 50 grams each, and the rubber is cured. Each rubber test specimen is ¼ inch thick and has a ⅜ inch cord embedment. After the rubber has been cured, the hot cured rubber piece is removed from the mold, cooled and H-test specimens are cut from said piece, each specimen consisting of a single cord encased in rubber and having each end embedded in the center of a rubber tab or embedment having a length of around 1 inch or so. The specmens are then aged at least 16 hours at room temperature. The force required to separate the cord from the rubber is then determined at room temperature (about 25° C.) or at 250° F. (121° C.) using an INSTRON tester provided with specimen grips. The maximum force in pounds required to separate the cord from the rubber is the H-adhesion value. All the data submitted in the working examples which follow are based upon identical test conditions, and all of the test specimens were prepared and tested in the same way generally in accordance with ASTM Designation: D 2138-72.

Aramid cords or fabric coated with the successive adhesive dips of the present invention can have up to about 20%, preferably up to about 15%, total by weight (dry) solids (pick up) of the adhesive dip, including the primer if used, on the cord based on the weight of the cord and can be used in the manufacture of carcasses, belts, flippers and chafers of radial, bias, or belted-bias passenger tires, truck tires, motorcycle tires, off-the-road tires and airplane tires, and, also, in making transmission belts, V-belts, conveyor belts, hose, gaskets, tarpaulins and the like.

While the adhesive containing aramid fiber reinforcing element can be adhered to vulcanizable natural rubber, rubbery butadiene-styrene copolymer or rubbery polybutadiene or blend thereof by curing the same in combination together, it is apparent that the heat cured adhesive containing aramid fiber reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, acrylic rubbers, isoprene-acrylonitrile rubbers and the like and mixtures of the same. These rubbers can be mixed with the usual compounding ingredients including sulfur, stearic acid, zinc oxide, magnesium oxide, silica, carbon black, accelerators, antioxidants, antidegradants and other curatives, rubber compounding ingredients and the like well known to those skilled in the art for the particular rubbers being employed.

The following examples will serve to illustrate the present invention with more particularity to those skilled in the art. In these examples parts are parts by weight unless otherwise noted. In these examples the rubber compound or stock in which the dipped cords were embedded, cured and used for the static H-adhesion tests was as follows:

| Material | Parts By Weight |
|---|---|
| Natural Rubber | 46.5 |
| ENDOR (peptizer, activated zinc salt of penta-chlorothiophenol, duPont) | 0.14 |
| SBR-1551 (free radical aqueous emulsion, cold polymerized, copolymer of butadiene-1,3 and styrene, target bound styrene of 23.5%, nominal Mooney viscosity ML 1 + 4 (212° F. of 52) | 38.5 |
| Polybutadiene (stereospecific, solution polymerized, 92-93% cis, nominal Mooney viscosity ML 1 + 4 at 100° C. of 45-47) | 15.0 |
| Fast extrusion furnace carbon black | 45.0 |
| Precipitated hydrated amorphous silica (Hi-Sil 210, PPG Industries) | 15.0 |
| Oil, highly aromatic | 5.0 |
| Zinc oxide | 3.0 |
| Stearic acid | 1.5 |
| Antioxidant (BLE, high temperature reaction product of diphenyl amine and acetone, Uniroyal Chemical) | 2.0 |
| AROFENE 8318 (Octylphenol formaldehyde, non-heat reactive, Sp gr. 1.000–1.050. Flake. Soft pt (R&B), 85–105. Acid number 40–60. Ash, percent 0.1 max. Methylol content, percent none. Tackifier, Ashland Chem.) | 1.5 |
| COHEDUR RL (a mixture of resorcinol and COHEDUR A, which is the hexa or pentamethyl ether of hexamethylol melamine, with a small amount of dibutyl phthalate plasticizer for viscosity control. Naftone, Inc.) | 4.7 |
| SANTOCURE NS (N—t-butyl-2-benzothiazolesulfenamide, Monsanto, Rubber Chemicals Div.) | 1.4 |
| Sulfur (80% sulfur in oil, CRYSTEX, Stauffer Chem.) | 3.0 |

The dipped and dried tire cords were cured in the above rubber compound for 30 minutes at 317° F. and 20 tons ram pressure. Also, in these examples the aramid tire cord used in the dips was KEVLAR (1500/3, poly(p-phenylene terephthalamide),

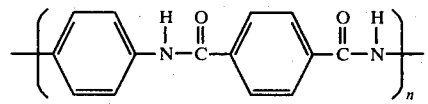

where n is a number, duPont.)

EXAMPLE 1

1. A phenol-formaldehyde (PF) resin was prepared as follows:

| | |
|---|---|
| 209g | phenol (90% phenol, balance water) |
| 487g | formaldehyde (37% formaldehyde, balance water) |
| 6g | NaOH (50% NaOH, balance water) |
| 702g | (53% solids) |

The materials were reacted for 1 hour at 80° C. and then placed in a refrigerator for storage. The mole ratio of phenol to formaldehyde was 1:3. Just before use this P-F resin composition was diluted with water as follows:

| | |
|---|---|
| 100.0g | above PF resin (53% solids) |
| 32.5g | H₂O |
| 132.5g | diluted PF resin (40% solids) |

2. A resorcinol-formaldehyde (RF) resin composition was prepared as follows:

```
14.54g  PENACOLITE (75% solids in water)
 4.40g  1 N NaOH
 8.10g  water
 2.97g  formaldehyde (37% solids), added just before
        using this RF resin composition
30.01g  (40% solids)
```

3. Diluted PF resin and RF resin. (plus additional water) were added separately to the latex slowly with stirring to avoid "shock" coagulation. The dip composition was as follows:

22.5 g above diluted PF resin (40% solids)
7.5 g above RF resin (40% solids)
6.0 g H₂O (added to RF resin as above)
244.0 g latex (41% solids)

The dip was then aged for at least 16 hours. The dip was then diluted with water (50 parts water/50 parts dip composition) to provide 20% solids.

Greige KEVLAR cord was then passed through the diluted dip and an air heated tunnel with 0 tension (but enough pull to prevent slack) at a rate of 90 seconds at a temperature of 470° F. (243° C.) to coat and/or impregnate the cord and to heat set or heat cure and/or dry the dip composition on the cord. The resulting cords were then embedded in the above rubber stock, cured and tested for H-adhesion. The dipping step and following heat treatment step were then applied on similar Greige KEVLAR cords for two and three successive times before combining with the rubber, curing and testing for H-adhesion at room temperature and 250° F. (the H-adhesions are the average of 5 pulls for each cord). The results on testing are shown in Table I, below:

TABLE I

Multiple Dipping with PF/RF/L Adhesive on KEVLAR

| Group | | H-adhesion, pounds | | |
|---|---|---|---|---|
| | | One Dip | Two Dips | Three Dips |
| A | At R. T (room temperature, about 25° C.) | 53.5 | 61.9 | 65.4 |
| | At 250° F. | 39.3 | 42.1 | 40.0 |
| | DPU*, % | 5.70 | 7.85 | 9.58 |
| B** | At R. T. | 53.4 | 59.5 | 66.5 |
| | At 250° F. | 34.7 | 37.3 | 39.6 |

*DPU (dip pick up) determined by H₂SO₄ digestion, duPont procedure.
**Group B was dipped at lower tension by removing the brake from the KEVLAR spool.

EXAMPLE 2

1A. Greige KEVLAR cord was passed through the following dip and air oven (tunnel) dried at a rate of 60 sec. at 475° F. and 0 stretch:
698 g water
2 g 10% NaOH aqueous
16 g Di-glycidylglycerol (NER 010A, Nagase Chem. Co.)
4 g AEROSOL OT (American Cyanamid Co., dioctyl sodium sulfosuccinate), 5% aqueous solution.

2A. A resorcinol-formaldehyde (RF) resin master composition was prepared as follows:

| | Parts By Weight (grams) | |
|---|---|---|
| Material | Dry | Wet |
| Resorcinol | 11.0 | 11.0 |
| Formaldehyde (37% aq.) | 6.0 | 16.2 |

-continued

| | Parts By Weight (grams) | |
|---|---|---|
| Material | Dry | Wet |
| NaOH | 0.3 | 0.3 |
| Water (soft preferred) | — | 238.5 |
| Total | 17.3 | 266 |
| Total solids content of about 5.4%* | | |
| pH should be a minimum of about 7.0 | | |

*for purposes of calculating TSC use 3 parts of formaldehyde

The second cord dip was prepared as follows:

| | Parts By Weight | |
|---|---|---|
| Material | Dry | Wet |
| Latex (41%) | 100.0 | 244.0 |
| RF Resin Master (above) | 17.3 | 266.0 |
| Water (soft preferred) | — | 60.0 |
| Ammonium hydroxide (28% aq.) | — | 11.3 |
| Total | 117.3 | 581.3 |
| TSC of about 20% | | |
| pH should be a minimum of about 10.3 | | |

3A. The above epoxide primed KEVLAR cord from 1A. is then passed through the cord dip of 2A. at 90 seconds and through an air tunnel for drying at 470° F. with 0 stretch. The steps of successively dipping the cord in cord dip 2A. and drying were successively repeated on similar epoxide primed KEVLAR cords (from 1A.). The dried cords were then combined with the above rubber stock, cured and tested for H-adhesion (average of 5 pulls). The results on testing are shown in Table II, below:

TABLE II

Multiple Dipping with RFL Adhesive on Primed KEVLAR

| Group | | H-adhesion, pounds | | |
|---|---|---|---|---|
| | | One Primer Dip One RFL Dip | One Primer Dip Two RFL Dips | One Primer Dip Three RFL Dips |
| C | At R. T. | 44.8 | 56.3 | 66.1 |
| | At 250° F. | 35.6 | 38.5 | 40.1 |
| | DPU*, % | 5.78 | 8.11 | 10.66 |
| D** | At R. T. | 53.9 | 55.3 | 63.7 |
| | At 250° F. | 37.1 | 39.7 | 44.1 |

*DPU determined by H₂SO₄ digestion, duPont procedure.
**Group D was dipped at lower tension by removing the brake from the KEVLAR spool.

EXAMPLE 3

The method of Example 2, above, was repeated on KEVLAR cord except that multiple epoxide primer dips were used. The results obtained on H-adhesion tests are shown in Table III, below:

TABLE III

| Number of Epoxy Primer Dips (Ex. 2, part 1A.) | Number of RFL Dips (Ex. 2, part 2A.) | H-adhesion Pounds at Room Temperature |
|---|---|---|
| 1 | 1 | 43.4 |
| 1 | 2 | 50.8 |
| 1 | 3 | 53.2 |
| 2 | 1 | 40.9 |
| 2 | 2 | 51.4 |
| 2 | 3 | 56.5 |
| 3 | 1 | 41.1 |
| 3 | 2 | 50.3 |
| 3 | 3 | 59.7 |

The results of these tests show that in some instances multiple primer dipping may be helpful.

EXAMPLE 4

The method of this Example was similar to the foregoing examples except that Greige KEVLAR cord and diglycidyl glycerol primed KEVLAR cord (like Example 2, part 1A.) were used. The second dip, RFL, was prepared by first mixing together 141 g of water, 6.1 g of 28% ammonium hydroxide and 22 g of PENACOLITE (75% solids). The resulting mixture was then added to 244 g of the latex (41% solids) and 11 g of a solution of 37% formalin in 58 g of water to make a RFL cord dip (25% solids) which was aged for 16 hours before use. The cords were passed through the RFL dip at 90 seconds and 470° F. Successive RFL overdippings and drying were repeated with the cords. The cords were cured in the above rubber stock for 30 minutes at 329° F. instead of 317° F. The results obtained on testing are shown in Table IV, below:

TABLE IV

| Cord | H-adhesion, pounds at R. T. | | | |
|---|---|---|---|---|
| | | RFL overdips | | |
| | None | One Dip | Two Dips | Three Dips |
| Greige KEVLAR | 34.5 | 46.0 | 50.3 | 55.8 |
| Epoxy Primed KEVLAR | 44.4 | 50.9 | 56.5 | 64.3 |

EXAMPLE 5

The method of this example was similar to that of Example 4, above. The RF resin was prepared from PENACOLITE and formaldehyde and diluted with water (50:50) to give a 20% RF resin solution. The dip contained:

244 g latex (41% solids),
60 g RF resin (20% solids) and
256 g water.

The resulting dip composition or mixture contained 20% solids and was aged 16 hours before use. After dipping in the cord dip and drying once, then repeating the process twice and then curing in the above rubber stock, the results obtained on greige KEVLAR cord, H-adhesion at room temperature, are as follows:

one dip: 46.5 pounds
two dips: 52.9 pounds

EXAMPLE 6

The method of this example was similar to the foregoing examples. A phenol-formaldehyde resin composition was prepared at 40% solids. A resorcinol formaldehyde resin was prepared at 40% solids.

A cord dip was prepared from these compositions as follows:

| Material | Wet, g | Dry, g |
|---|---|---|
| P—F resin | 45 | 18 |
| R—F resin | 15 | 6 |
| Water | 6 | — |
| Latex (41% solids) | 244 | 100 |
| | 310g | 124g (40% solids) |

Greige KEVLAR cord was then single dipped and double dipped, cured in the rubber and tested. The results on test are shown below:

| | H-adhesion, pounds | |
|---|---|---|
| | One dip | Two dips |
| R. T. | 51.3 | 66.9 |
| 250° F. | 39.1 | — |

Little or no improvement in H-adhesion was obtained using the double dip system with adhesive activated polyester tire cords.

Notes for the above examples:

A. The PENACOLITE used was:
PENACOLITE R-2170-Aqueous solution of resorcinol-formaldehyde resin or condensation product made with excess resorcinol (requiring formaldehyde to convert it to an infusible resin). Solids, % resin 75±2; pH of 0.5–2.0. Viscosity, 23° C. (Brookfield) poises of 35–85. Specific gravity 23°/23° C. of 1.23–1.26. Koppers Company, Inc.

B. The latex used was:
A free radical aqueous emulsion polymerized terpolymer of about 70 parts of weight of butadiene-1,3, 15 parts by weight of styrene and 15 parts by weight of 2-vinyl pyridine. 41% solids, Brookfield viscosity (cps) of 30, pH of 10.7, Mooney viscosity ML-4 at 212° F. of 40, surface tension (dynes/cm) of 48 and substantially freeze stable.

I claim:

1. A method for adhering a poly(p-phenylene terephthalamide) reinforcing element to a rubber compound which comprises (I) treating said element with a composition comprising an aqueous alkaline dispersion of about 10 to 50% by weight of solids consisting essentially of (a) a rubbery vinyl pyridine copolymer and (b) at least one water soluble thermosetting resin prepared from reactants consisting essentially of a compound selected from the group consisting of phenol, resorcinol, the cresols, the xylenols, p-tert butylphenol and p-phenyl phenol and mixtures thereof and of an aldehyde donor selected from the group consisting of formaldehyde, acetaldehyde, furfural, paraformaldehyde and hexamethylenetetramine and mixtures thereof in an amount of from about 3 to 25 parts by weight dry per 100 parts total by weight dry of (a), heating said treated element at a temperature of from about 200° to 600° F. for from about 300 to 5 seconds to remove essentially all of the water from said composition and to provide said element with a heat cured or heat set adhesive, and repeating step (I) at least one more time, to provide said reinforcing element with a dry adhesive in an amount of up to about 20% total by weight (dry) based on the weight of said reinforcing element, and (II) combining said dried and heat cured adhesive containing reinforcing element with an unvulcanized vulcanizable rubber compound and vulcanizing the same.

2. A method according to claim 1 where said reinforcing element is first primed by dipping said element in an aqueous dispersion or solution of an epoxide and drying before carrying out step (I).

3. A method according to claim 1 where step (I) is repeated at least two times.

4. A method according to claim 3 where said reinforcing element is first primed by dipping said element in an aqueous dispersion or solution of an epoxide and drying before carrying out step (I).

5. A method according to claim 1 where in (b) the resin comprises a mixture of a resorcinol-formaldehyde resin and a phenol-formaldehyde resin.

6. A method according to claim 2 where in (b) the resin comprises a resorcinol-formaldehyde resin.

7. A method according to claim 1 wherein said rubbery vinyl pyridine copolymer of (a) is a terpolymer of from about 60 to 80% by weight of butadiene-1,3, from about 7 to 32% by weight of styrene, and from about 4 to 22% by weight of 2-vinyl pyridine, wherein said resin of (b) is used in an amount of from about 6 to 20 parts by weight dry per 100 parts total by weight dry of (a), wherein said resin of (b) comprises a mixture of a phenol-formaldehyde resin and a resorcinol-formaldehyde resin, wherein said reinforcing agent contains up to about 15% total by weight of said dry adhesive and wherein the solids content of said dispersion is from about 20 to 25% by weight.

8. A method which comprises (I) treating a poly(p-phenylene terephthalamide) reinforcing element with a composition comprising an aqueous alkaline dispersion of about 10 to 50% by weight of solids consisting essentially of (a) a rubbery vinyl pyridine copolymer and (b) at least one water soluble thermosetting resin prepared from reactants consisting essentially of a compound selected from the group consisting of phenol, resorcinol, the cresols, the xylenols, p-tert butylphenol and p-phenyl phenol and mixtures thereof and of an aldehyde donor selected from the group consisting of formaldehyde, acetaldehyde, furfural, paraformaldehyde and hexamethylenetetramine and mixtures thereof in an amount of from about 3 to 25 parts by weight dry per 100 parts total by weight dry of (a), heating said treated element at a temperature of from about 200° to 600° F. for from about 300 to 5 seconds to remove essentially all of the water from said composition and to provide said element with a heat cured or heat set adhesive, and repeating step (I) at least one more time, to provide said reinforcing agent with a dry adhesive in an amount of up to about 20% total by weight (dry) based on the weight of said reinforcing element.

9. A method according to claim 8 where said reinforcing element is first primed by dipping said element in an aqueous dispersion or solution of an epoxide and drying before carrying out step (I).

10. A method according to claim 8 where step (I) is repeated at least two times.

11. A method according to claim 10 where said reinforcing element is first primed by dipping said element in an aqueous dispersion or solution of an epoxide and drying before carrying out step (I).

12. A method according to claim 8 where in (b) the resin comprises a mixture of a resorcinol-formaldehyde resin and a phenol-formaldehyde resin.

13. A method according to claim 9 where in (b) the resin comprises a resorcinol-formaldehyde resin.

14. A method according to claim 8 wherein said rubbery vinyl pyridine copolymer of (a) is a terpolymer of from about 60 to 80% by weight of butadiene-1,3, from about 7 to 32% by weight of styrene, and from about 4 to 22% by weight of 2-vinyl pyridine, wherein said resin of (b) is used in an amount of from about 6 to 20 parts by weight dry per 100 parts total by weight dry of (a), wherein said resin of (b) comprises a mixture of a phenol-formaldehyde resin and a resorcinol-formaldehyde resin, wherein said reinforcing element contains up to about 15% total by weight of said dry adhesive and wherein the solids content of said dispersion is from about 20 to 25% by weight.

* * * * *